Aug. 16, 1949.　　　　A. E. MUMPER　　　　2,479,395
CHICKEN SCALDING MACHINE

Filed Sept. 28, 1946　　　　　　　　　　6 Sheets-Sheet 1

Inventor:
Albert Edward Mumper
By Lee J. Gary
Attorney

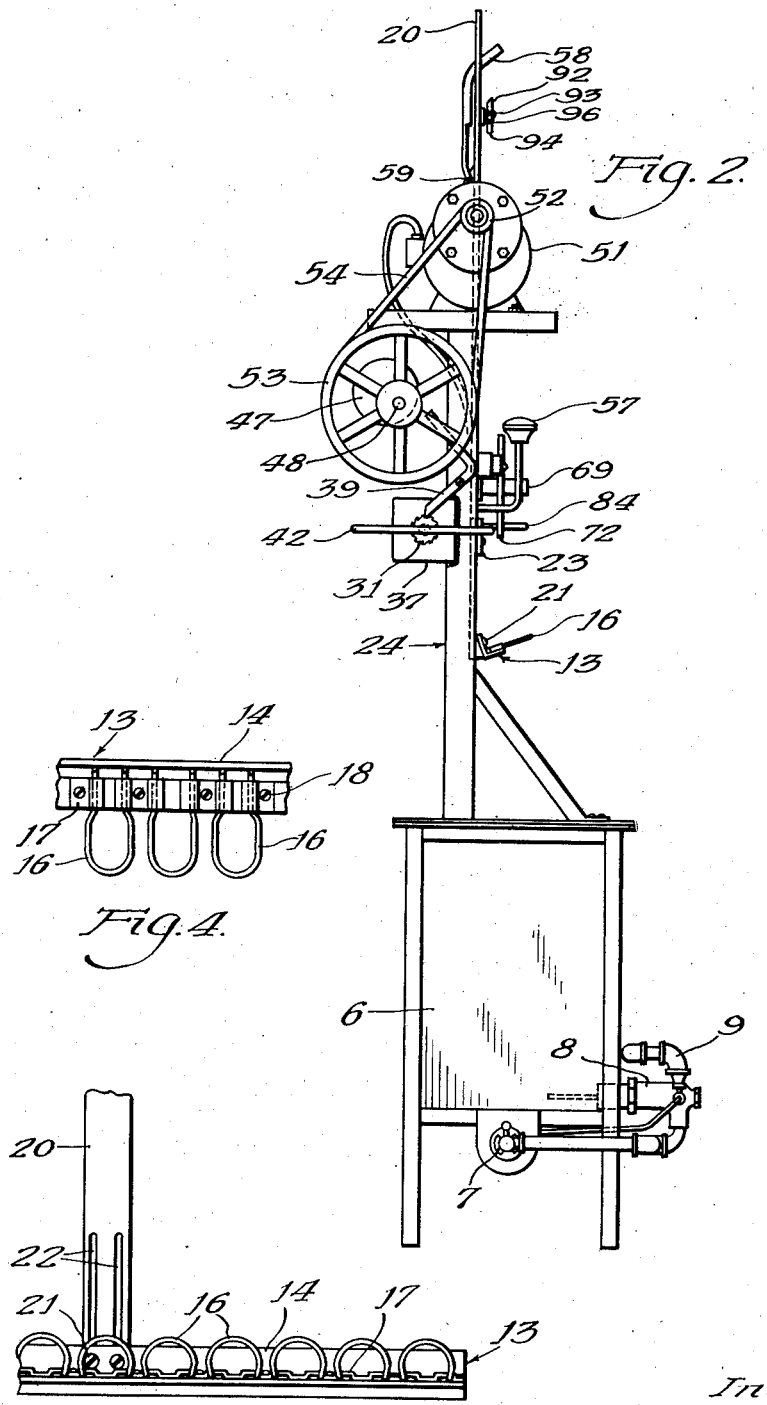

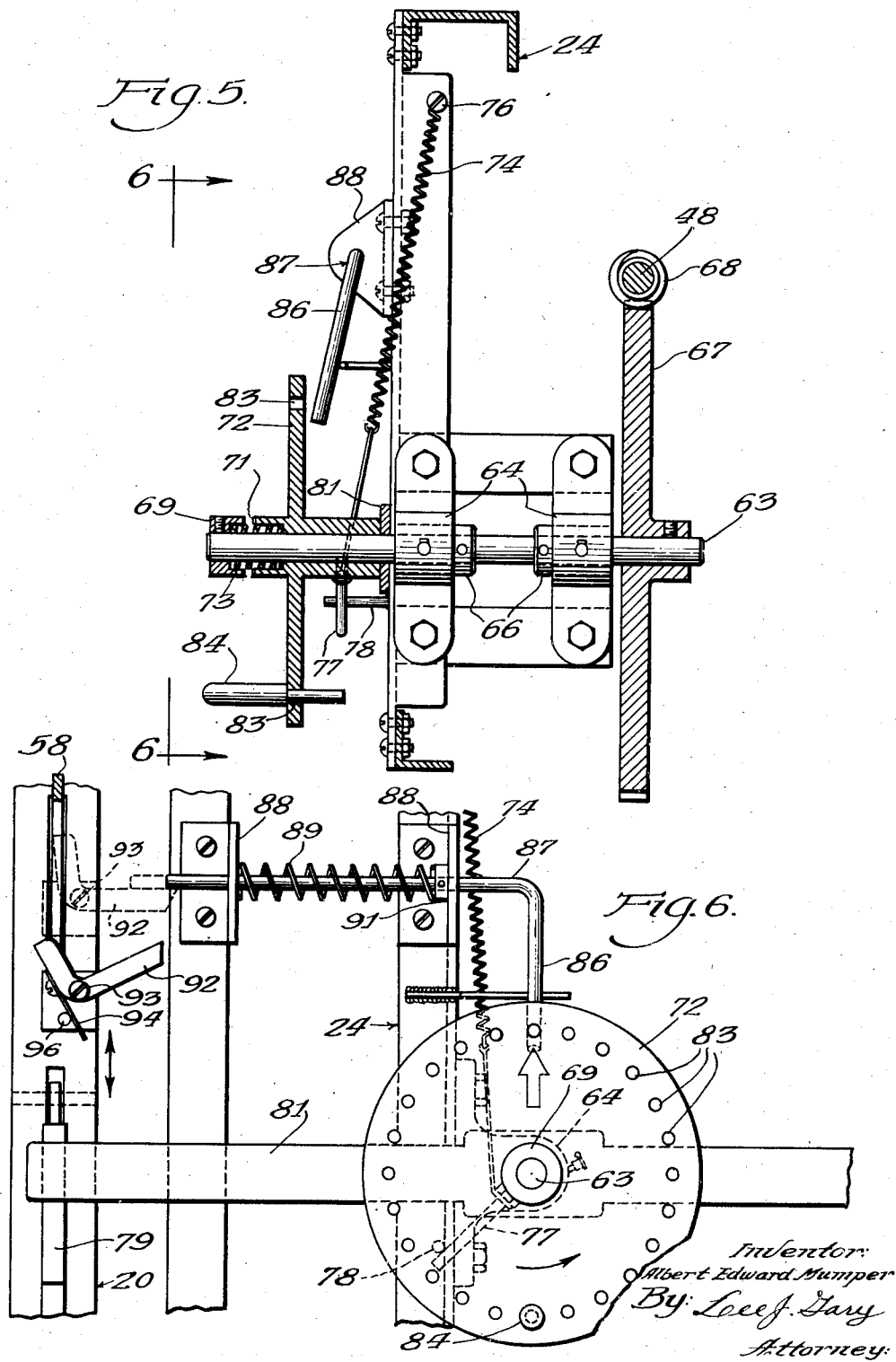

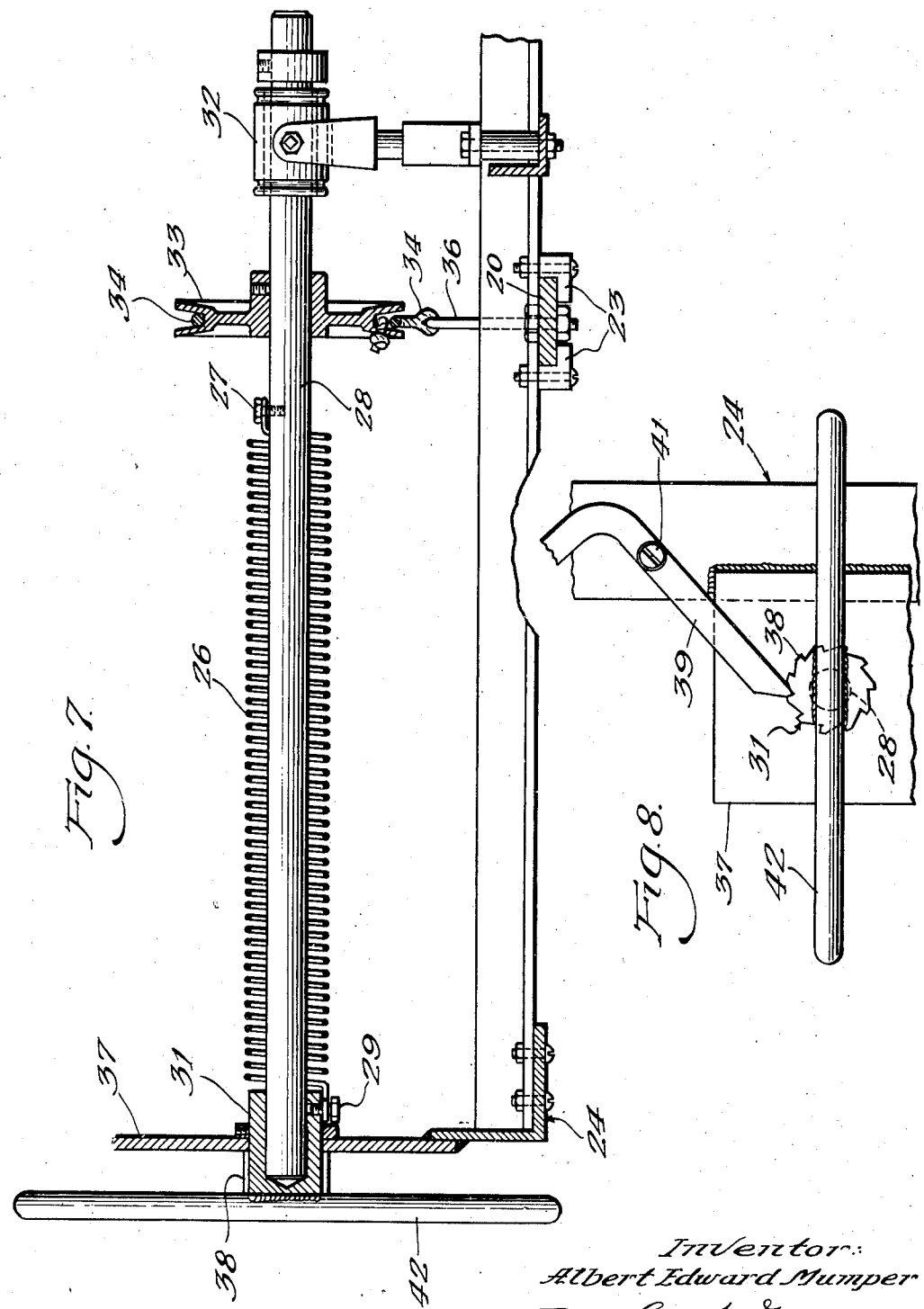

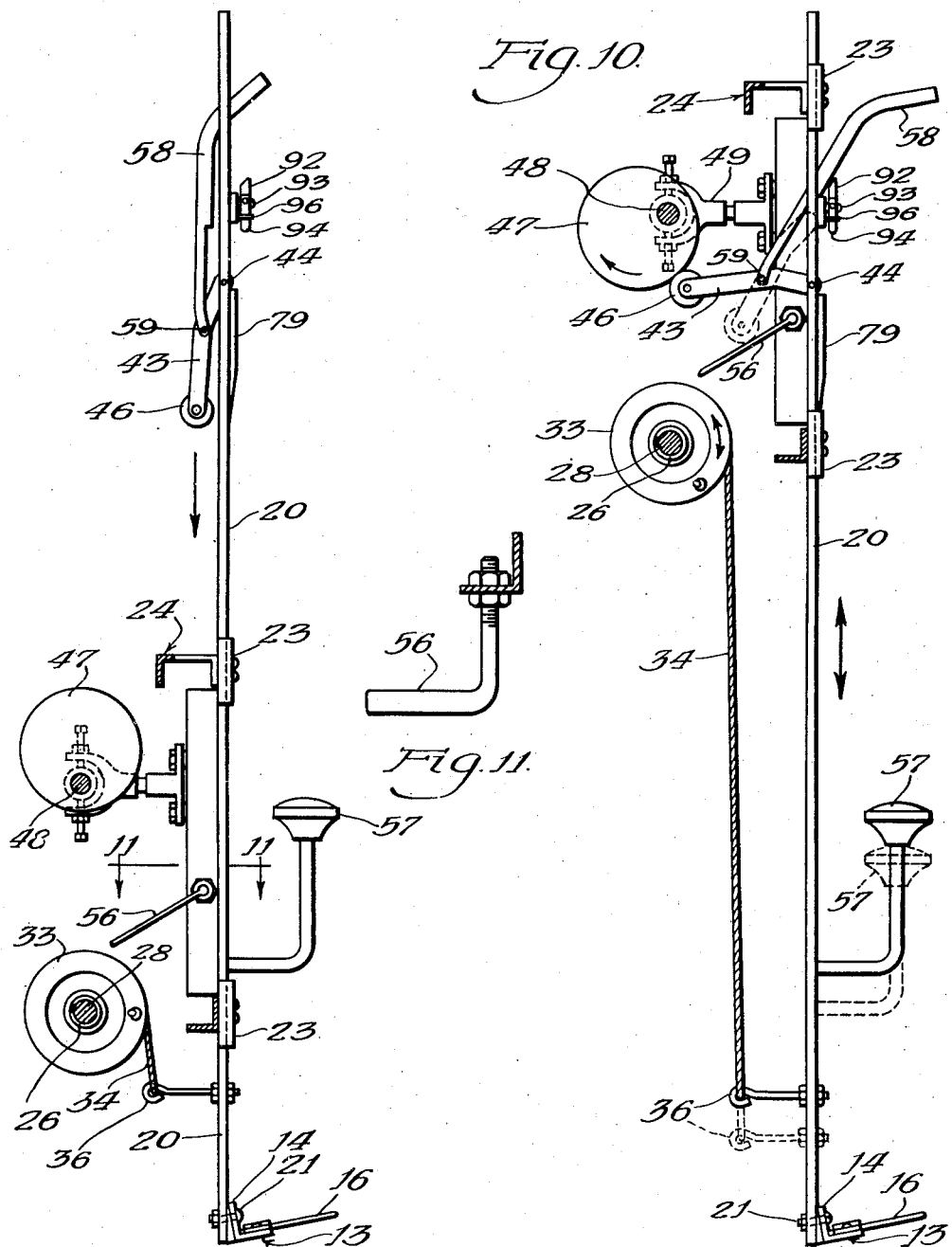

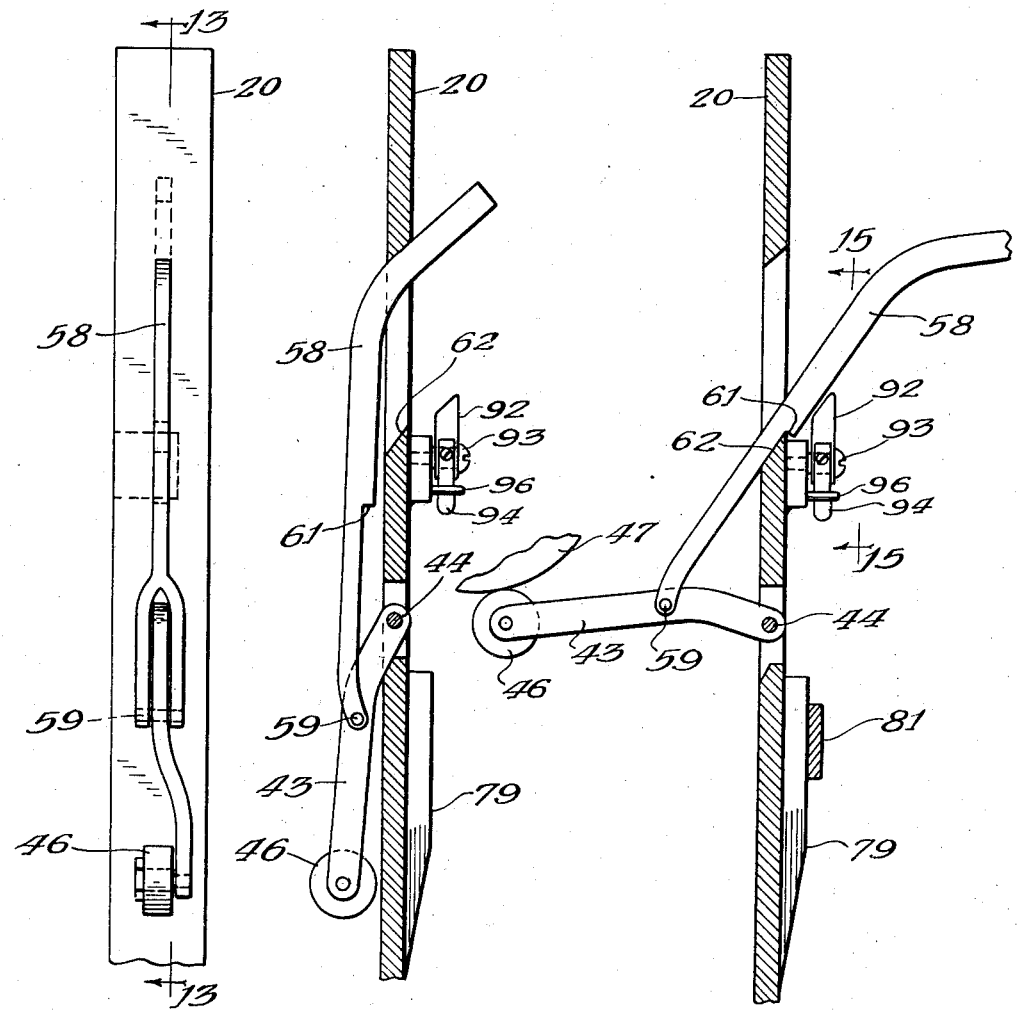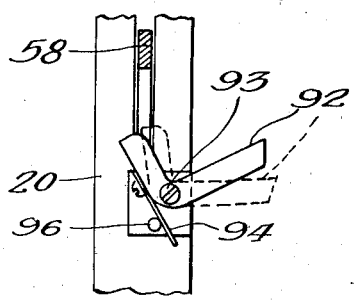

Patented Aug. 16, 1949

2,479,395

UNITED STATES PATENT OFFICE 2,479,395

CHICKEN SCALDING MACHINE

Albert E. Mumper, Ottawa, Ill.

Application September 28, 1946, Serial No. 700,076

9 Claims. (Cl. 17—11.2)

This invention relates to improvements in chicken scalding machines and has for an object the provision of a machine in which chickens are suspended from their feet and reciprocated vertically within a tank of scalding water to facilitate the removal of their feathers during a subsequent plucking operation.

In order to facilitate the plucking of feathers from chickens, it is essential that the scalding water is brought into contact with the skin of a chicken, under the feathers. In other types of apparatus, it has been common practice to place the chickens within a tank of scalding water for a predetermined length of time and without regard to the fact that chicken feathers act to prevent the movement of scalding water into contact with the skin of the chicken under the feathers. The present invention contemplates the provision of an apparatus in which a chicken is drawn upwardly through a body of scalding water to flare the chicken feathers outwardly from the body of the chicken and thus permit the scalding water to come into direct contact with the body of the chicken adjacent the base of the feathers. In the use of the apparatus shown and described, it has been learned that the time required for loosening the feathers is materially reduced, thereby effecting a saving in time and labor and also preventing injury to the skin texture of the chicken due to excessive exposure to scalding water.

It is a further object of this invention to provide a chicken scalding machine in which a chicken is subjected to the scalding water for a predetermined length of time; after which, means is provided for automatically removing the chicken from the tank of scalding water.

This invention further contemplates the provision of a chicken scalding machine embodying means for varying the duration of the chicken scalding operation, depending upon the type of chicken being scalded. It will be understood that when a chicken is left in a body of scalding water for a period of time beyond that necessary to loosen the feathers, the scalding water acts to cook and discolor the skin of the chicken and thus materially reduces its market value.

This invention embodies other novel features, details of construction and arrangement of parts which are hereinafter set forth in the specification and claims and illustrated in the accompanying drawings wherein:

Fig. 2 is a side elevational view of same.

Fig. 3 is an enlarged detail front elevational view showing the rack for receiving the legs of chickens.

Fig. 4 is a fragmentary detail plan view of Fig. 3.

Fig. 5 is an enlarged detail sectional view taken along the line 5—5 of Fig. 1.

Fig. 6 is a detail sectional view taken along the line 6—6 of Fig. 5.

Fig. 7 is an enlarged detail sectional view taken along the line 7—7 of Fig. 1.

Fig. 8 is a detail end elevational view of the rack return mechanism illustrated in Fig. 7.

Fig. 9 is a sectional view with the rack supporting bar shown in elevation taken along the line 9—9 of Fig. 1, showing the rack supporting bar in its upper inoperative position for suspending chickens above a body of scalding water.

Fig. 10 is a sectional view corresponding to Fig. 9, in which the rack supporting bar is illustrated in its operative position for reciprocating chickens vertically within a body of scalding water.

Fig. 11 is an enlarged detail sectional view taken along the line 11—11 of Fig. 9.

Fig. 12 is an enlarged fragmentary detail front elevational view showing the upper portion of the rack supporting bar.

Fig. 13 is a detail sectional view taken along the line 13—13 of Fig. 12, showing the means employed for reciprocating the rack supporting bar in inoperative position.

Fig. 14 is a sectional view corresponding to Fig. 13, in which the means employed for actuating the rack supporting bar are disposed in operative position.

Fig. 15 is a detail sectional view taken along the line 15—15 of Fig. 14.

Figure 1:
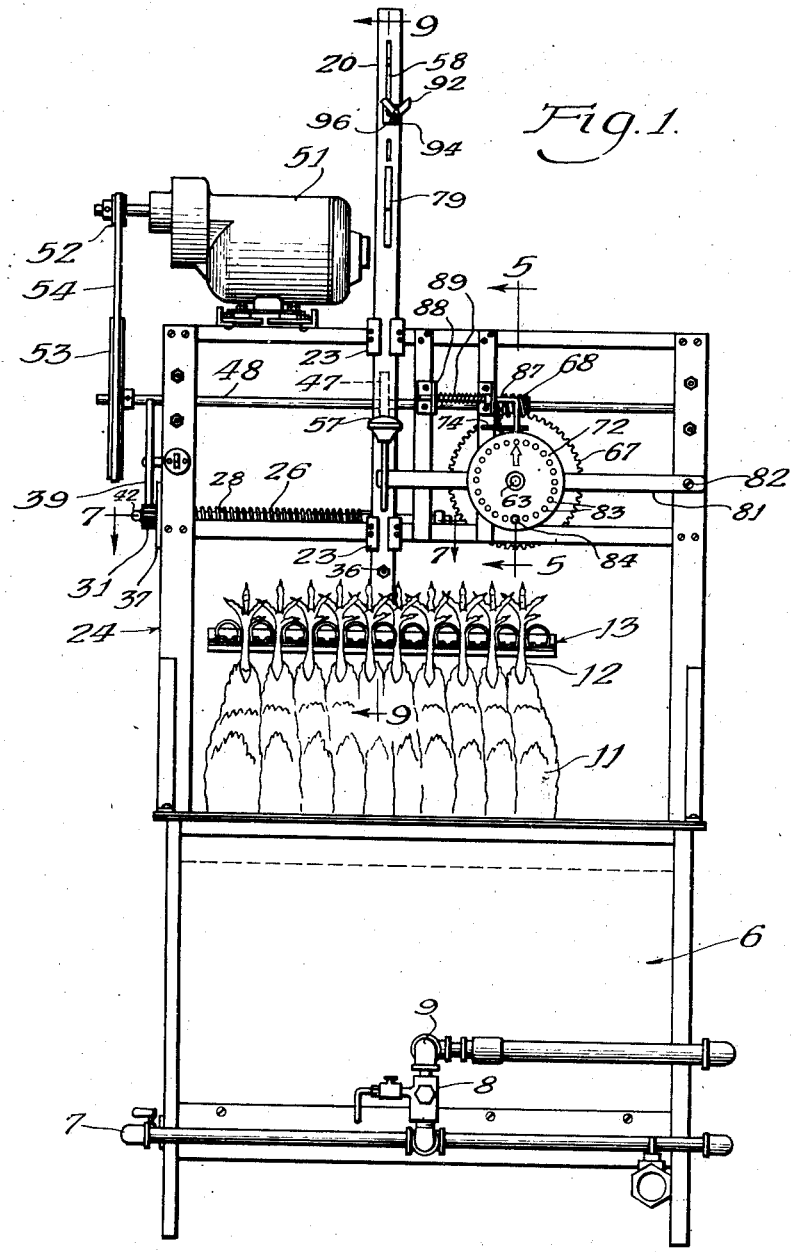
Fig. 1 is a front elevational view showing a chicken scalding machine embodying features of this invention.

Referring now to the drawings for a better understanding of this invention, the chicken scalding machine is shown as comprising a tank 6 adapted to be filled with water heated to a proper predetermined temperature by means of gas burners generally indicated at 7. The temperature of the water is adapted to be maintained at a scalding temperature by means of a thermostatic control 8 which controls the passage of gas through the pipe line 9 to the burners 7.

The tank 6 is open at the top to receive a plurality of chickens 11 suspended from their legs 12 upon a horizontally disposed rack 13. The rack 13 preferably comprises an angle iron 14 having a plurality of U-shaped wire members 16 secured thereon in spaced relation by means of a locking strip 17 and screws 18. The U-shaped wire members 16 are inclined upwardly and outwardly, as illustrated in Fig. 9 to receive the legs of chickens therebetween.

The rack 13 is mounted on the lower end of a rack actuating bar 20 by means of bolts 21. It will be noted that the bolts 21 are mounted in slots 22 formed in the rack actuating bar 20, as illustrated in Fig. 3, to permit vertical adjustment of the rack along the rack actuating bar.

The rack actuating bar 20 is mounted for vertical reciprocable movement in bearings 23 provided on a suitable framework generally indicated at 24. The rack actuating bar 20 is normally held in its upper inoperative position to support the chickens 11 above the tank 6, as illustrated in Fig. 1, by means of a helical torque spring 26 having its one end secured by means of a screw 27 to a shaft 28 and its other end secured by a screw 29 to a ratchet wheel 31. One end of the shaft 28 is journaled on a bearing 32 and the other end is journaled in the ratchet wheel 31. A pulley 33 is secured to the shaft 28 to receive one end of a cable 34 which has its other end secured to an eye bolt 36 provided on the lower end of the rack actuating bar 20. The ratchet wheel 31 is journaled in a bearing 37 and formed with ratchet teeth 38 for engagement by a pawl 39 pivotally mounted on a shoulder screw 41. A handle 42 is welded to the outer end of the ratchet wheel 31 and is adapted to be rotated in a counter-clockwise direction, as illustrated in Fig. 8, to place a predetermined torque load on the torque spring 26. It will be understood that the torque spring 26 acts through the shaft 28, pulley 32, and cable 34 to normally support the rack actuating bar 20 in its upper inoperative position when said rack actuating bar is supporting a plurality of chickens in the manner illustrated in Fig. 1.

A cam actuating arm 43 is pivotally mounted at 44 on the rack actuating bar 20 and has a roller 46 journaled on its outer end for engagement with a cam 47 secured on a cam shaft 48. The cam shaft 48 is journaled in suitable bearings 49 provided on the frame 24 and is driven by means of a motor 51 through suitable pulleys 52 and 53 and a belt 54.

The cam actuating arm 43 is moved from its inoperative position, illustrated in Figs. 9 and 13, to its operative position, illustrated in Figs. 10 and 14, by means of a track member 56 when the rack actuating bar 20 is manually moved downwardly by pressure applied upon the handle 57. Fig. 10 clearly illustrates the manner in which the roller 46 moves along the track 56 during downward movement of the rack actuating bar 20, causing the cam actuating arm 43 to be thrown outwardly and upwardly into operative position as illustrated in Fig. 14. When the cam actuating arm 43 is disposed in operative position, a latch 58 is caused to be moved upwardly and outwardly from its position, illustrated in Fig. 13, to its locking position, illustrated in Fig. 14. The latch 58 is pivotally connected to the cam actuating arm 43 at 59 and is provided with a locking shoulder 61 for engagement with a locking shoulder 62 provided on the rack actuating bar.

When the cam actuating arm 43 is disposed in its operative position, as illustrated in Fig. 14, rotation of the cam 47 acts through the cam actuating arm 43 to reciprocate the rack actuating bar 20 in a vertical direction, as illustrated in Fig. 10. It will be noted that the cam 47 acts to move the rack actuating bar 20 downwardly, while the torque spring 26 acts to yieldably resist downward movement of the rack actuating bar and to urge the latter upwardly to maintain the roller 46 in constant engagement with the cam 47. During reciprocative movement of the rack actuating bar 20, it will be noted that the chickens 11 will be submerged within the scalding water contained within the tank 6, and that upward vertical movement of the rack actuating bar causes the chicken feathers to flare outwardly away from the body of the chicken to permit the scalding water to contact the skin of a chicken adjacent the base of the feathers. By employing this method of scalding chickens it has been learned that the chicken feathers become loosened within a relatively short time and that the chickens may be removed from the tank of scalding water before the skin of the chicken becomes discolored, or cooked.

The duration of the chicken scalding operation is controlled by means of a timing apparatus which may be set to a predetermined time for the chicken scalding operation, and which acts to automatically permit the return of the rack actuating bar 20 to its upper inoperative position, illustrated in Fig. 1, at the termination of the chicken scalding operation. The timing mechanism, illustrated in Figs. 1, 5 and 6 comprises a timing shaft 63 journaled in suitable bearings 64 and secured against axial movement by means of collars 66 secured to the shaft and engaging opposing faces of the bearings 64. A worm gear 67 is secured to the inner end of the timing shaft 63 for engagement by a worm 68 secured to the cam shaft 48. A tooth clutch member 69 is secured to the outer end of the timing shaft 63 for operative engagement with teeth 71 provided on a timing wheel 72 when the rack actuating bar 20 is moved downwardly to its operative position. The timing wheel 72 is journaled for rotational and axial movement on the timing shaft 63 and is normally held in its rearward inoperative position and out of engagement with the clutch member 69 by means of a compression spring 73. The timing wheel 72 is also normally maintained in its position, illustrated in Figs. 5 and 6, by means of a tension spring 74 having its one end secured to the frame 24 at 76 and its other end secured to a stop arm 77. The timing wheel 72 is normally disposed in the position illustrated in Fig. 6 in which the stop arm 77 is in abutting engagement against a stop pin 78 mounted on the frame 24.

When the rack actuating bar 20 is moved downwardly to its operative position, a cam surface 79, formed on the bar 20, acts to move the free end of a clutch arm 81 in a forward direction. The clutch arm 81 is pivotally mounted on the frame 24 by means of a bolt 82 and is provided with an aperture to receive the timing shaft 63. It will thus be noted that forward pivotal movement of the clutch arm 81 causes forward movement of the timing wheel 72 and engagement of the clutch teeth 71 with the clutch teeth provided on the clutch member 69. During reciprocative movement of the rack actuating bar 20, the cam surface 79 and clutch arm 81 act to maintain clutch teeth 71 in clutching engagement with the clutch member 69, thereby causing the timing wheel 72 to rotate in a counter-clockwise direction, as indicated by the arrow 56.

In order to terminate the reciprocative movement of the rack actuating bar 20 after a predetermined interval of time, a plurality of apertures

18 are provided in the face of the timing wheel 72 to receive a timer pin 84. The timer pin 84 is formed to project rearwardly through a selected aperture 83 for engagement with an offset portion 86 formed on a latch release stop arm 87. The arm 87 is journaled for axial movement in suitable bearings 88—88, the arm 87 being movable in one direction responsive to engagement by the timer pin 84 and movable in an opposite direction by means of a compression spring 89 interposed between a bearing 88 and a collar 91 secured to the arm 87.

A latch release lever 92 is pivotally mounted at 93 on the rack actuating bar 20 for engagement by the latch release stop arm 87 when the latter is moved to its forward position by means of the timer pin 84. The latch release lever 92, when engaged by stop arm 87, acts to move the latch 58 upwardly and forwardly to disengage the latch shoulder 61 from the shoulder 62 provided on the rack actuating bar 20. After the latch 58 is moved out of its engagement with the rack actuating bar 20, the cam actuating arm 43 is free to drop downwardly out of engagement with the cam 47 to the position illustrated in Fig. 13. After the cam actuating arm 43 is moved to its inoperative position, illustrated in Fig. 13, the torque spring 26 acts through the shaft 32, pulley 32, and cable 34 to draw the rack actuating bar 20 upwardly to its inoperative position illustrated in Fig. 1. A flat spring 94 is secured to the latch release lever 92 for engagement against a pin 96 provided on the rack actuating bar 20 to normally hold the latch release lever in its position, indicated in Fig. 6, and to yieldably resist pivotal movement of the lever 92 when the latter is engaged by the stop arm 87.

In the operation of the machine thus shown and described, the rack actuating bar is manually moved from its inoperative position to its lower operative position, as illustrated in Figs. 9 and 10, respectively. When the rack actuating bar 20 is in its lower position, the cam actuated arm 43 is held in operative engagement with the cam 47, thereby providing a relatively short stroke and reciprocative movement of the rack actuating bar 20. After a predetermined interval of time, the timing pin 84 provided on the timer plate 72 moves into engagement with the latch release stop arm 87 to cause the latter to be positioned in the line of travel of one end of the latch release lever 92. The latch release lever 92 then acts to release the latch 58 to permit the cam actuated arm 43 to return from its operative position, illustrated in Fig. 14, to its inoperative position, illustrated in Fig. 13. When the cam actuating arm 43 is returned to its inoperative position, the torque spring 26 acts to raise the rack actuating bar to its upper inoperative position.

While this invention has been shown in but one form, it is obvious to those skilled in the art that it is not so limited but is susceptible of various changes and modifications without departing from the spirit and scope of the claimed invention.

I claim as my invention:

1. In a machine for scalding chickens in a tank of hot water, a frame, a rack supporting bar movable in a vertical plane along said frame between an upper loading position and a lower scalding position, a cam actuated arm mounted on said rack supporting bar, and a power driven cam disposed to engage said cam actuated arm when said rack supporting bar is in its scalding position to impart reciprocative movement to said rack supporting bar.

2. In a machine for scalding chickens in a tank of hot water, a frame, a rack supporting bar movable in a vertical plane along said frame between an upper loading position and a lower scalding position, said rack being manually movable from its loading position to its scalding position, a cam actuated arm mounted on said rack supporting bar, and a power driven cam disposed to engage said cam actuated arm when said rack supporting bar is in its scalding position to impart reciprocative movement to said rack supporting bar.

3. In a machine for scalding chickens in a tank of hot water, a frame, a rack supporting bar movable in a vertical plane along said frame between an upper loading position and a lower scalding position, a cam actuated arm pivotally mounted on said rack supporting bar, and a power driven cam disposed to engage said cam actuated arm when said rack supporting bar is in its scalding position to impart reciprocative movement to said rack supporting bar.

4. In a machine for scalding chickens in a tank of hot water, a frame, a rack supporting bar movable in a vertical plane along said frame between an upper loading position and a lower scalding position, a cam actuated arm pivotally mounted on said rack supporting bar, a power driven cam disposed to engage said cam actuated arm when said rack supporting bar is in its scalding position to impart reciproative movement to said rack supporting bar, and a latch pivotally mounted on said cam actuated arm to engage said rack supporting bar to hold said cam actuated arm in position to be engaged by said cam.

5. In a machine for scalding chickens in a tank of hot water, a frame, a rack supporting bar movable in a vertical plane along said frame between an upper loading position and a lower scalding postion, a cam actuated arm pivotally mounted on said rack supporting bar, a power driven cam disposed to engage said cam actuated arm when said rack supporting bar is in its scalding position to impart reciprocative movement to said rack supporting bar, a latch pivotally mounted on said cam actuated arm to engage said rack supporting bar to hold said cam actuated arm in position to be engaged by said cam, and timing means to move said latch out of engagement with said rack supporting bar after a predetermined interval of time.

6. In a machine for scalding chickens in a tank of hot water, a frame, a rack supporting bar movable in a vertical plane along said frame between an upper loading position and a lower scalding position, a cam actuated arm pivotally mounted on said rack supporting bar, a power driven cam disposed to engage said cam actuated arm when said rack supporting bar is in its scalding position to impart reciprocative movement to said rack supporting bar, a latch pivotally mounted on said cam actuated arm to engage said rack supporting bar to hold said cam actuated arm in position to be engaged by said cam, timing means to move said latch out of engagement with said rack supporting bar after a predetermined interval of time, and means to automatically return said rack supporting bar from its scalding position to its loading position when said latch is moved out of engagement with said rack supporting bar.

7. In a machine for scalding chickens in a tank of hot water, a frame, a rack supporting bar movable in a vertical plane along said frame between an upper loading position and a lower scalding position, a cam actuated arm pivotally mounted on said rack supporting bar, a power driven cam disposed to engage said cam actuated arm when said rack supporting bar is in its scalding position to impart reciprocative movement to said rack supporting bar, a latch pivotally mounted on said cam actuated arm to engage said rack supporting bar to hold said cam actuated arm in position to be engaged by said cam, timing means to move said latch out of engagement with said rack supporting bar after a predetermined interval of time, means to automatically return said rack supporting bar from its scalding position to its loading position when said latch is moved out of engagement with said rack supporting bar, said timing means including a rotatable timing plate provided with a plurality of apertures adjacent its periphery, a timing plug for selective insertion in said plate apertures, and means actuated by said timing plug for moving said latch out of engagement with said rack supporting bar.

8. In a machine for scalding chickens in a tank of hot water, a frame, a rack supporting bar movable in a vertical plane along said frame between an upper loading position and a lower scalding position, a cam actuated arm pivotally mounted on said rack supporting bar, a power driven cam disposed to engage said cam actuated arm when said rack supporting bar is in its scalding position to impart reciprocative movement to said rack supporting bar, a latch pivotally mounted on said cam actuated arm to engage said rack supporting bar to hold said cam actuated arm in position to be engaged by said cam, timing means to move said latch out of engagement with said rack supporting bar after a predetermined interval of time, means to automatically return said rack supporting bar from its scalding position to its loading position when said latch is moved out of engagement with said rack supporting bar, said timing means including a rotatable timing plate provided with a plurality of apertures adjacent its periphery, a timing plug for selective insertion in said plate apertures, means actuated by said timing plug for moving said latch out of engagement with said rack supporting bar, and means for automatically returning said timing plate to its initial position responsive to movement of said rack supporting bar from its scalding position to its loading position.

9. In a machine for scalding chickens in a tank of hot water, a frame, a rack supporting bar movable in a vertical plane along said frame between an upper loading position and a lower scalding position, a cam actuated arm pivotally mounted on said rack supporting bar, a power driven cam disposed to engage said cam actuated arm when said rack supporting bar is in its scalding position to impart reciprocative movement to said rack supporting bar, a latch pivotally mounted on said cam actuated arm to engage said rack supporting bar to hold said cam actuated arm in position to be engaged by said cam, timing means to move said latch out of engagement with said rack supporting bar after a predetermined interval of time, means to automatically return said rack supporting bar from its scalding position to its loading position when said latch is moved out of engagement with said rack supporting bar, said timing means including a rotatable timing plate provided with a plurality of apertures adjacent its periphery, a timing plug for selective insertion in said plate apertures, means actuated by said timing plug for moving said latch out of engagement with said rack supporting bar, means for automatically returning said timing plate to its initial position responsive to movement of said rack supporting bar from its scalding position to its loading position, and means to effect rotation of said timing plate responsive to movement of said rack supporting bar from its loading position to its scalding position.

ALBERT E. MUMPER.

REFERENCES CITED

The following references are of record in the file of this patent:

UNITED STATES PATENTS

| Number | Name | Date |
|---|---|---|
| 661,514 | Gaillard | Nov. 13, 1900 |
| 1,637,096 | Allen | July 26, 1927 |
| 1,646,690 | Doty | Oct. 25, 1927 |
| 1,825,584 | Donley | Sept. 29, 1931 |
| 2,000,056 | Wilson | May 7, 1935 |
| 2,048,607 | Griffey | July 21, 1936 |
| 2,408,248 | Barber | Sept. 24, 1946 |